(12) United States Patent
Thomas et al.

(10) Patent No.: US 11,880,603 B2
(45) Date of Patent: Jan. 23, 2024

(54) STORAGE SYSTEM AND METHOD FOR PRESERVING OVERWRITTEN DATA TO ALLOW A FUTURE ROLLBACK

(71) Applicant: Western Digital Technologies, Inc., San Jose, CA (US)

(72) Inventors: Nicholas Thomas, Sunnyvale, CA (US); Eran Erez, San Jose, CA (US); Matt Davidson, Mountain View, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 84 days.

(21) Appl. No.: 17/724,725

(22) Filed: Apr. 20, 2022

(65) Prior Publication Data
US 2023/0342078 A1    Oct. 26, 2023

(51) Int. Cl.
*G06F 3/06*    (2006.01)
(52) U.S. Cl.
CPC .......... *G06F 3/0659* (2013.01); *G06F 3/0604* (2013.01); *G06F 3/0679* (2013.01)
(58) Field of Classification Search
None
See application file for complete search history.

(56) References Cited

U.S. PATENT DOCUMENTS

| | | | | |
|---|---|---|---|---|
| 8,032,725 B1* | 10/2011 | Malinowski | ........ | G06F 11/1076 |
| | | | | 711/163 |
| 10,146,637 B1* | 12/2018 | Chopra | ............... | G06F 11/1451 |
| 2013/0042049 A1* | 2/2013 | Fiske | .................. | G06F 12/0246 |
| | | | | 711/E12.008 |
| 2015/0032980 A1* | 1/2015 | Winokur | ............... | G06F 3/0665 |
| | | | | 711/162 |
| 2015/0058442 A1* | 2/2015 | Raskin | .................. | G06F 3/0619 |
| | | | | 709/217 |
| 2019/0332265 A1* | 10/2019 | Sun | ...................... | G06F 11/1461 |
| 2021/0397715 A1* | 12/2021 | Duval | ..................... | G06F 9/542 |

FOREIGN PATENT DOCUMENTS

WO    WO-2015026833 A1 *    2/2015    ............. G06F 11/14

* cited by examiner

*Primary Examiner* — Charles Rones
*Assistant Examiner* — Ryan Dare
(74) *Attorney, Agent, or Firm* — Crowell & Moring LLP

(57) ABSTRACT

A storage system receives a command from a host to overwrite data that is stored in a memory of the storage system. The command may have been issued in error or by malware, so the storage system preserves the data that the host wants to overwrite, just in case the host later wants to recover the data. To do this, the storage system associates the physical address of the location of the memory that stores the data with a logical block address that is inaccessible by the host. To recover the data, the storage system replaces the logical block address that is inaccessible by the host with a logical block address that is accessible by the host.

20 Claims, 10 Drawing Sheets

US 11,880,603 B2

STORAGE SYSTEM AND METHOD FOR PRESERVING OVERWRITTEN DATA TO ALLOW A FUTURE ROLLBACK

BACKGROUND

Valuable data stored in a storage system may be overwritten accidentally by a user or intentionally by a malicious actor. Recovering the overwritten data may not be possible if the storage system does not intentionally preserve data that is overwritten. This is a particular concern when a storage system is maliciously attacked by so-called ransomware or other forms of malware that cause data to be lost or corrupted. To allow such data to be recovered, some storage systems provide a "rollback" feature that backs-up all data to a different storage system and/or uses software to identify what data has been changed and store the change information in new files in new logical locations.

DETAILED DESCRIPTION

The following embodiments generally relate to a storage system and method for preserving overwritten data to allow a future rollback. In one embodiment, a storage system is presented comprising a memory and a controller. A logical block address space of the memory comprises a user space and a snapshot space. The controller is configured to receive a command from a host to overwrite data associated with a logical block address in the user space, wherein an entry in a map associates a physical address of a location in the memory that stores the data and the logical block address; and in response to receiving the command: assign the data to a snapshot logical block address in the snapshot space; and modify the entry in the map to associate the physical address and the snapshot logical block address instead of the logical block address.

In another embodiment, a method is provided comprising: receiving a command from a host to overwrite data stored in the memory; and preserving the data for a future rollback operation by associating a physical address of an area in the memory that stores the data with a logical block address that is not accessible by the host.

In yet another embodiment, a storage system is provided comprising a memory, wherein a logical block address space of the memory comprises a user space and a snapshot space; means for receiving a command from a host to overwrite data stored in a logical block address in the user space, wherein an entry in a map associates a physical address of a location in the memory that stores the data and the logical block address; means for assigning the data to a snapshot logical block address in the snapshot space in response to receiving the command; and means for modifying the entry in the map to associate the physical address and the snapshot logical block address instead of the logical block address.

Other embodiments are provided and can be used alone or in combination.

Figure 1A:
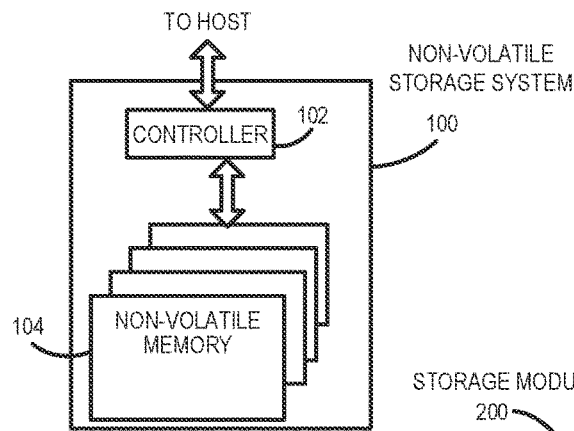
FIG. 1A is a block diagram of a non-volatile storage system of an embodiment.
Figure 1B:
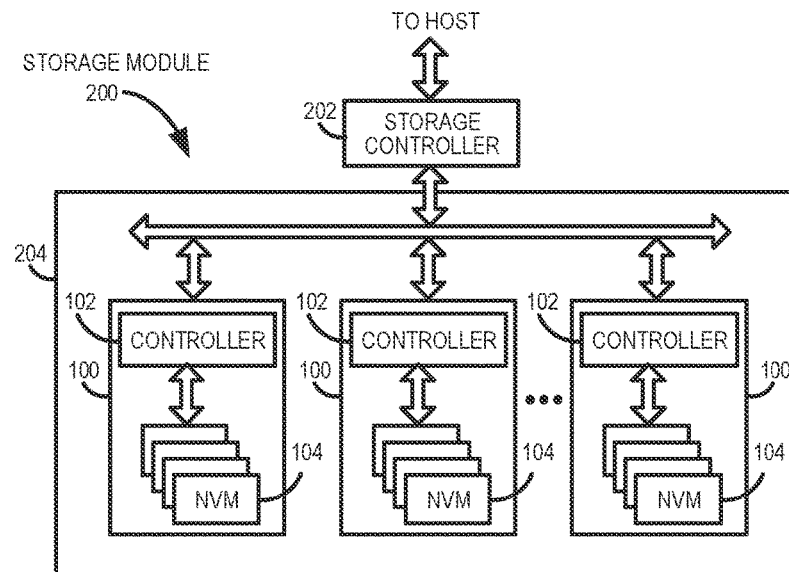
FIG. 1B is a block diagram illustrating a storage module of an embodiment.
Figure 1C:
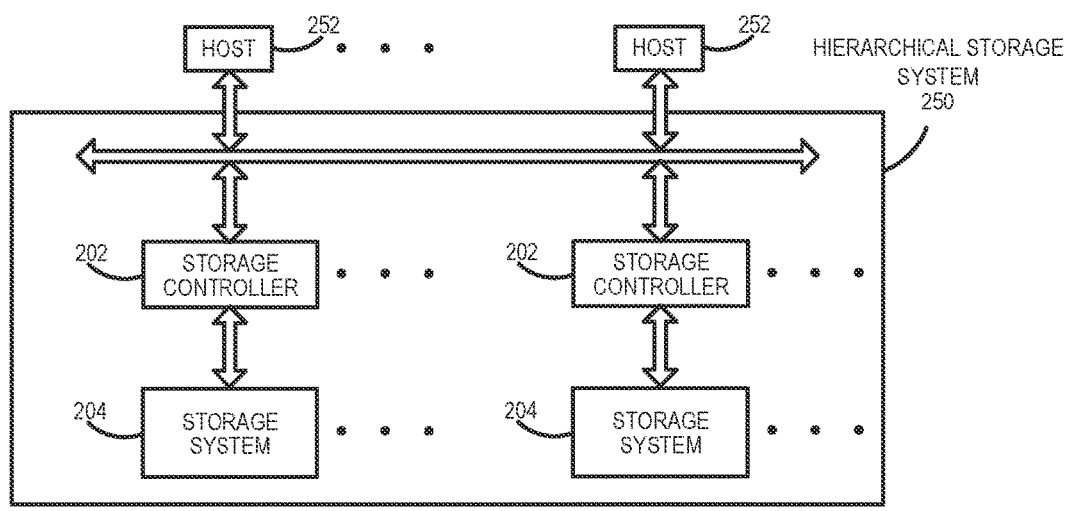
FIG. 1C is a block diagram illustrating a hierarchical storage system of an embodiment.

Turning now to the drawings, storage systems suitable for use in implementing aspects of these embodiments are shown in FIGS. 1A-1C. FIG. 1A is a block diagram illustrating a non-volatile storage system 100 (sometimes referred to herein as a storage device or just device) according to an embodiment of the subject matter described herein. Referring to FIG. 1A, non-volatile storage system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magneto-resistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory cells that would otherwise be repeatedly written to) and garbage collection (after a block is full, moving only the valid pages of data to a new block, so the full block can be erased and reused). Also, the structure for the "means" recited in the claims can include, for example, some or all of the structures of the controller described herein, programmed or manufactured as appropriate to cause the controller to operate to perform the recited functions.

Non-volatile memory die 104 may include any suitable non-volatile storage medium, including ReRAM, MRAM, PCM, NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), quad-level cell (QLC) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, storage system 100 may be a card-based system, such as a secure digital (SD) or a micro secure digital (micro-SD) card (or USB, SSD, etc.). In an alternate embodiment, storage system 100 may be part of an embedded storage system.

Although, in the example illustrated in FIG. 1A, non-volatile storage system 100 (sometimes referred to herein as a storage module) includes a single channel between controller 102 and non-volatile memory die 104, the subject matter described herein is not limited to having a single memory channel. For example, in some storage system architectures (such as the ones shown in FIGS. 1B and 1C), 2, 4, 8 or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile storage systems 100. As such, storage module 200 may include a storage controller 202 that interfaces with a host and with storage system 204, which includes a plurality of non-volatile storage systems 100. The interface between storage controller 202 and non-volatile storage systems 100 may be a bus interface, such as a serial advanced technology attachment (SATA), peripheral component interconnect express (PCIe) interface, or double-data-rate (DDR) interface. Storage module 200, in one embodiment, may be a solid-state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be a Non-Volatile Memory Express (NVMe) or fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
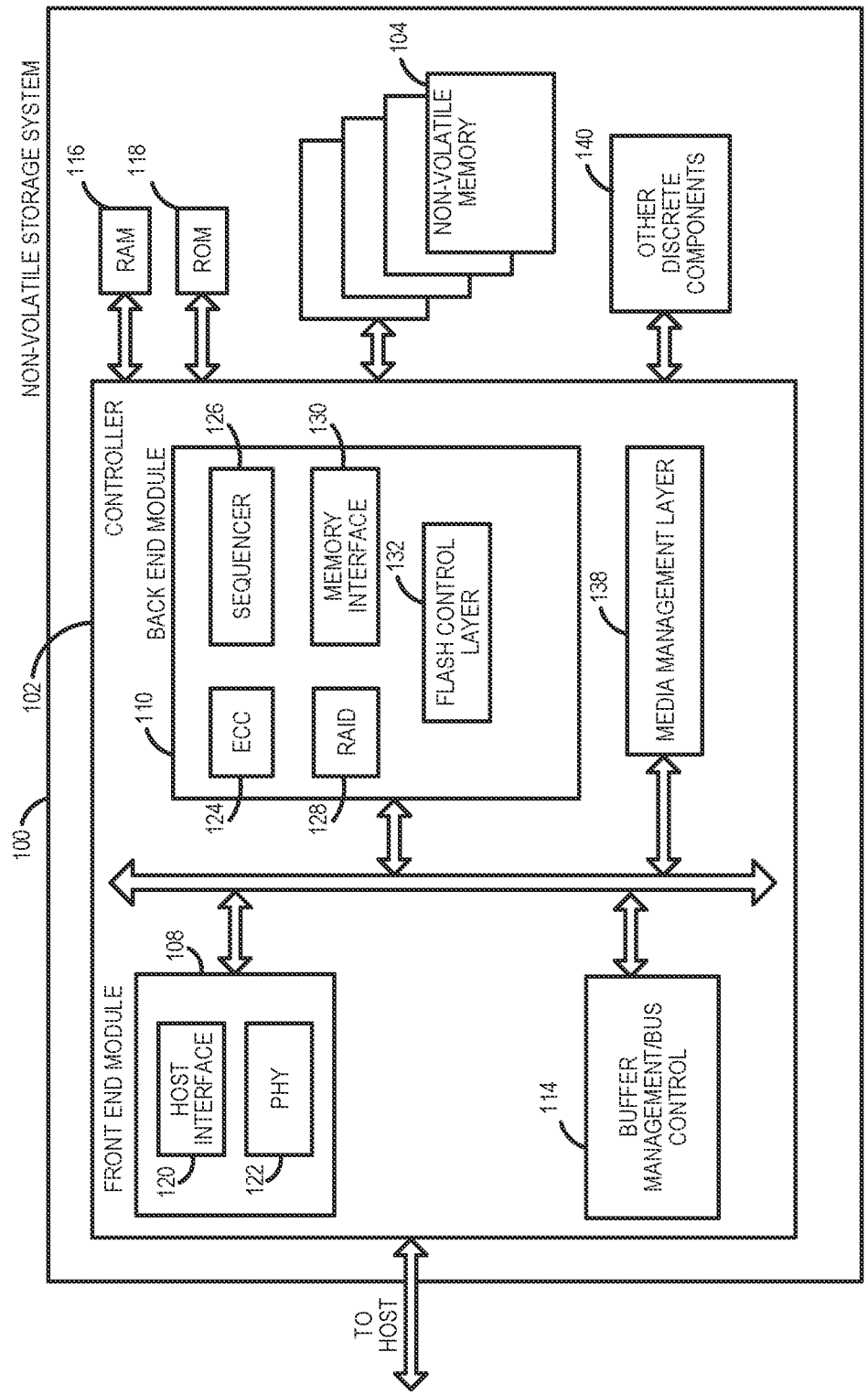
FIG. 2A is a block diagram illustrating components of the controller of the non-volatile storage system illustrated in FIG. 1A according to an embodiment.

FIG. 2A is a block diagram illustrating components of controller 102 in more detail. Controller 102 includes a front end module 108 that interfaces with a host, a back end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. The controller 102 may sometimes be referred to herein as a NAND controller or a flash controller, but it should be understood that the controller 102 can be used with any suitable memory technology, example of some of which are provided below.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

The storage system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
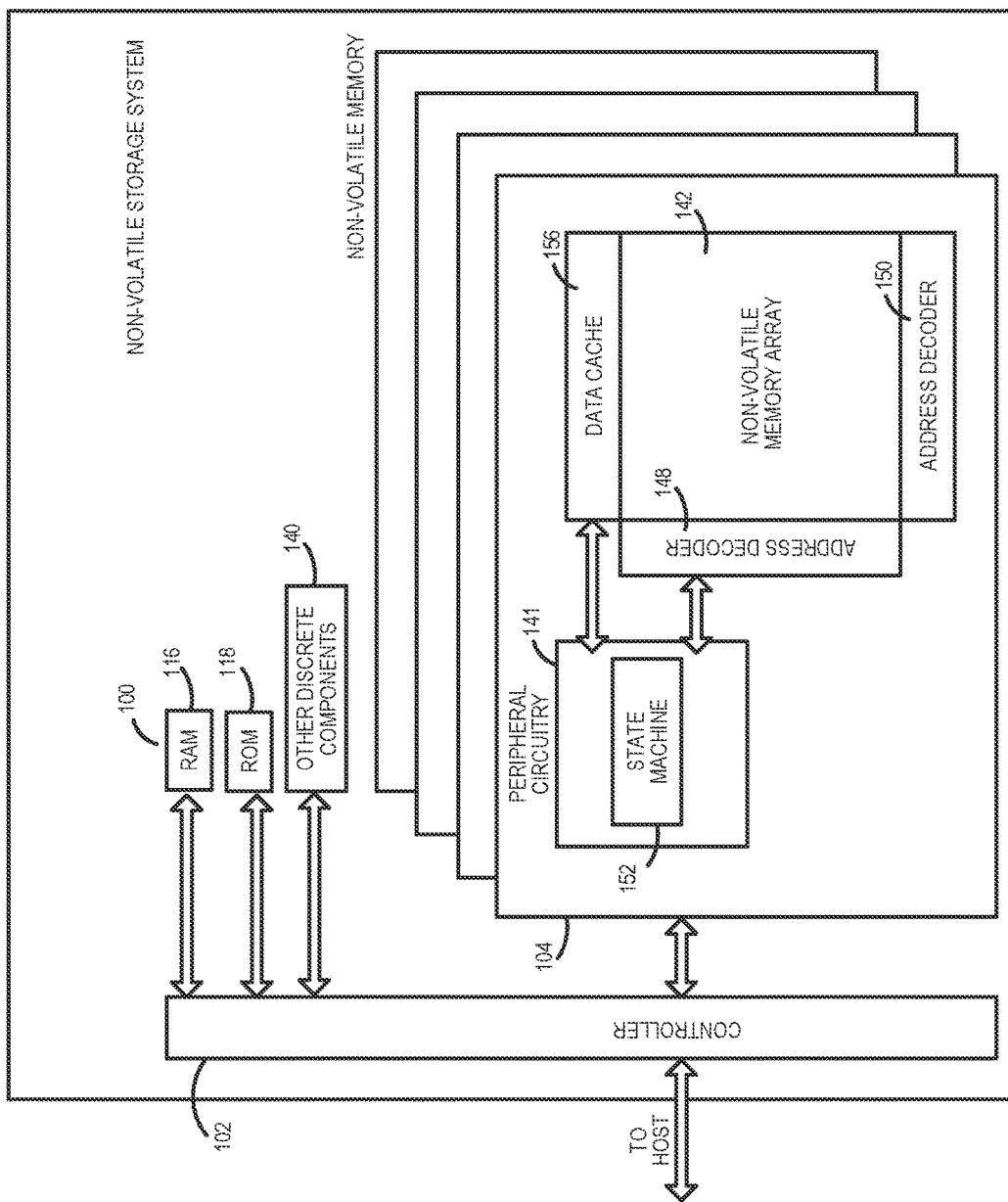
FIG. 2B is a block diagram illustrating components of the non-volatile storage system illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two dimensional and/or three dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may only be written in multiples of pages, and/or may not be written unless it is erased as a block of memory cells. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
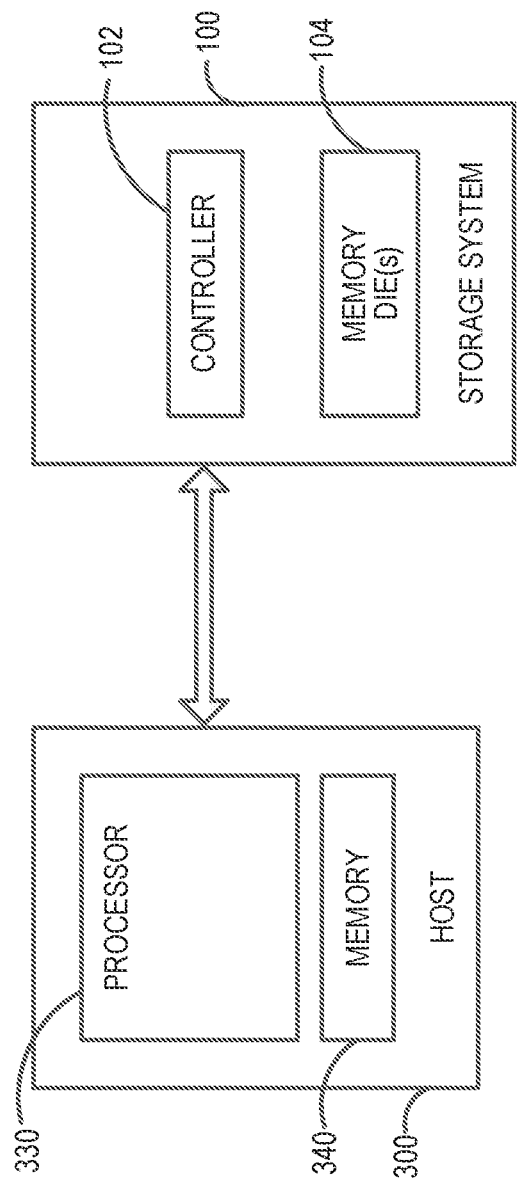
FIG. 3 is a block diagram of a host and a storage system of an embodiment.

Turning again to the drawings, FIG. 3 is a block diagram of a host 300 and storage system (sometimes referred to herein as a device) 100 of an embodiment. The host 300 can take any suitable form, including, but not limited to, a computer, a mobile phone, a digital camera, a tablet, a wearable device, a digital video recorder, a surveillance system, etc. The host 300 comprises a processor 330 that is configured to send data (e.g., initially stored in the host's memory 340 (e.g., DRAM)) to the storage system 100 for storage in the storage system's memory 104 (e.g., non-volatile memory dies). While the host 300 and the storage system 100 are shown as separate boxes in FIG. 3, it should be noted that the storage system 100 can be integrated in the host 300, the storage system 100 can be removably connected to the host 300, and the storage system 100 and host 300 can communicate over a network. It should also be noted that the memory 104 can be integrated in the storage system 100 or removably connected to the storage system 100.

As mentioned above, valuable data stored in a storage system may be overwritten accidentally by a user or intentionally by a malicious actor. Recovering the overwritten data may not be possible if the storage system does not intentionally preserve data that is overwritten. This is a particular concern when a storage system is maliciously attacked by so-called ransomware or other forms of malware that cause data to be lost or corrupted. To allow such data to be recovered, some storage systems provide a "rollback" feature that backs-up all data to a different storage system and/or uses software to identify what data has been changed and store the change information in new files in new logical locations.

The following embodiments can be used to recover overwritten data and return the storage system 100 to a previous stable state. In one embodiment, the storage system 100 preserves overwritten data using logical-to-physical mappings within snapshots to allow a future rollback (e.g., when the rollback request is instigated relatively soon after the overwrite). The embodiments can be implemented in the storage system 100 (e.g., in the controller 102) and, as such, can be more secure than logical copy techniques that rely upon a potentially-compromised host 300. Further, these embodiments can be run "silently" (i.e., with minimal performance overhead) since they do not require new data to be written.

In one embodiment, the storage system 100 uses a logical-to-physical mapping structure that stores logical data in physical locations in the memory 104 and logs the association between the logical block address (LBA) and the physical address in memory 104 in a forward translation table and a reverse translation table. The reverse translation table is primarily used in a garbage collection operation to determine the content of physical locations in the memory 104 and the validity of the data stored therein. The reverse table may be stored in any suitable location and, in one embodiment, is embedded within the data headers themselves or logged at strategic points within physical blocks in the memory 104. As used herein, a "map that associates a logical address and a physical address" can refer to a logical-to-physical address (forward) map and/or a physical-to-logical address (reverse) map (e.g., table or other data structure).

When data is overwritten (e.g., when a new host write occurs for an LBA that already holds data), the original data is dereferenced from both the forward and reverse mapping tables and is effectively deleted ("effectively" because the actual erase occurs during a subsequent block erase during the garbage collection process).

In one embodiment, extensions to the forward and reverse mapping structures are created, and these are used to temporarily preserve overwritten data in a way that it may be subsequently recovered in a rollback operation. More specifically, in the forward mapping table, special "snapshot LBAs" are set aside out of the range of normal, host-accessible LBAs. To simplify media management and to avoid running out of physical space, the user-accessible LBA space can be reduced in size to accommodate the snapshot LBA space, although this is not mandatory.

Figure 4:
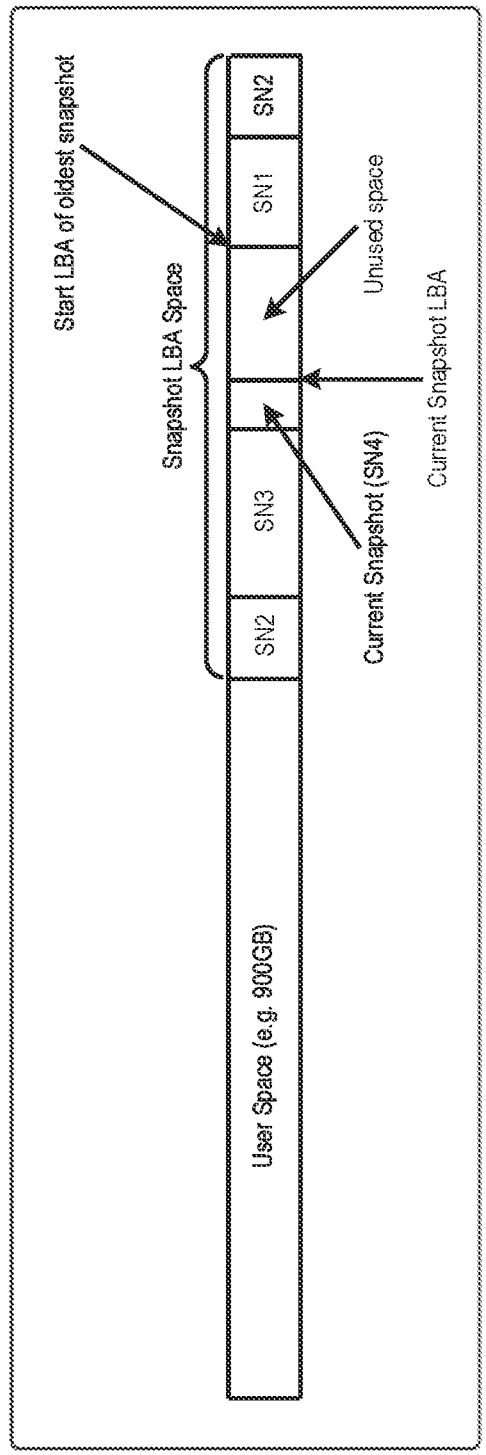
FIG. 4 is an illustration of a logical block address space of an embodiment.

FIG. 4 is an illustration of a logical block address space of an embodiment. As shown in FIG. 4, in this embodiment, the logical block address space comprises logical block addresses that are accessible by the host 300 (the user space) and logical block addresses that are not accessible by the host 300 (the snapshot space). The two spaces can be of any suitable size. In this example, the normal user space is 900 GB and the snapshot space is 100 GB (in this case, the labelled capacity advertised to the user can be 900 GB). It should be noted that the snapshot space can be dynamic/configurable. That is, since the user space may not be 100% logically full, it is possible to dynamically increase the snapshot LBA space to allow more snapshots to be preserved in case the storage system 100 is not full. In one embodiment, the snapshot LBA space is extended upwards but not downwards into the user LBA space. While the snapshot space is shown at the end of the LBA space in this embodiment, in other embodiments, the snapshot space is located in other location(s). In the example in FIG. 4, the snapshot LBA space comprises four snapshots (SN1, SN2, SN3, and SN4), as well as unused space. In this example, the current snapshot is SN4, which is pointed to by a pointer. As noted above, the actual data pertaining to the SN4 still exists in the user space. So, rolling back to SN4 would reinstate that data.

In the reverse mapping table, a new overwrite structure is added that stores the newly-allocated snapshot LBAs of the overwritten data preserved at any physical location in the memory 104. Each block (e.g., a jumbo block (jBlock)) in the memory 104 can have a reverse lookup linked list to link overwritten data to the snapshot LBA space. (As used herein, a "jumbo block (jBlock)" refers to a set of linked blocks.) This can be run-length encoded, and the overall overwrite capacity of the reverse table can match the allocated snapshot LBA space with typical command lengths.

During the write process for new host data, rather than being dereferenced, the overwritten data is assigned a new LBA in the snapshot LBA space, and the reverse mapping table entry for the current physical location of the overwritten data, rather than being invalidated, is set to point to the newly-allocated snapshot LBA. A "current snapshot LBA" pointer is incremented each time a new snapshot LBA is allocated and can wrap back around to the bottom of snapshot LBA space, as required. If the snapshot LBA space is ever used up or close to being used up (e.g., below a threshold set accordingly), starting from the least-recently overwritten data, the controller 102 can free the LBAs by finally dereferencing the overwritten data. This process is termed "snapshot delete." The reverse mapping table overwrite structure may also run short of memory space, and new space can be freed up similarly by using snapshot delete.

During the garbage collection operation, data allocated to snapshot LBAs is preserved. This is ensured by searching the new reverse mapping table overwrite structure indexed by a physical location to find if a snapshot LBA has been allocated to the physical location. If it has, the data is preserved, despite the fact that the data is currently not "valid" because it was overwritten by the host 300. When the overwritten data is copied to a new physical location during garbage collection, both the forward mapping table entry and the reverse mapping table overwrite structure are updated to reflect this change. The snapshot LBA allocated to the data does not change. Contents of the original reverse mapping structure for the physical location are also not changed and, therefore, still contain the host-accessible LBA.

Both snapshot rollback and delete may occur at the resolution of individual snapshot LBAs allocated, or stable snapshots may be created that are discrete points in time when the storage state is known to be stable. This avoids rollback to an unstable state. The stable snapshot information (effectively just the snapshot ID and the starting snapshot LBA) can be stored in a table. In one embodiment, the table includes the snapshot ID, the lowest LBA, the highest LBA, the current snapshot ID, and/or the current snapshot LBA. A new stable snapshot can be created at intervals in time (e.g., at low-power transitions), during a shutdown event, and/or as requested by an external application. The current snapshot ID can be incremented at that point to become the stable snapshot that can be rolled back to. Further host writes can cause overwritten data to be stored in special LBAs within the snapshot LBA space.

Regarding stable snapshots, it should be noted that not all states are stable, and the snapshot ID can be chosen to be at a stable state. If a user were allowed to rollback snapshot LBAs arbitrarily, it is possible that the rollback may be to an unstable point. The overhead of the snapshot table is small, so adding many snapshots has little memory cost. In one embodiment, many stable snapshots can be created (e.g., thousands in a 100 GB overwrite space). The design can be optimized to only preserve the overwritten data the first time an LBA is overwritten within the same snapshot ID.

During snapshot delete, the controller 102 removes the oldest snapshots by moving forward from the oldest snapshot LBA to the starting snapshot LBA of the second oldest snapshot and dereferencing all physical locations found therein. At the same time, the controller 102 frees the reverse mapping structure entries to those physical locations. This process allows continued creation of new snapshots with a finite resource of available snapshot LBAs and available memory space to contain the reverse mapping table overwrite structure.

During snapshot rollback, the newly-written data that overwrote data is removed, and the overwritten data is reset to be valid data. This can be done by searching backwards through snapshot LBAs from the current snapshot LBA (most-recently allocated) to the first snapshot LBA of the target snapshot. For each LBA, the physical location of the overwritten data is extracted from the forward table, and the host-accessible LBA for this physical location is extracted from the original reverse mapping table. The forward mapping of the host-accessible LBA is then updated to reflect the physical location. In other words, the overwritten data is re-referenced, and, in so doing, the newer data is dereferenced. The reverse mapping table overwrite structure pointing to the physical location is freed since this data is no longer "overwritten." As data is reinstated, the snapshot LBAs formerly assigned to the data are also reset. The trigger of a snapshot rollback may be handled by external software (e.g., using a user interface) or by some form of activity monitoring within the storage system.

The following paragraphs describe one particular example implementation of an embodiment. It should be understood that this is merely an example and other implementations and embodiments can be used. So, the details presented herein should not be read into the claims unless expressly recited therein.

Figure 5:
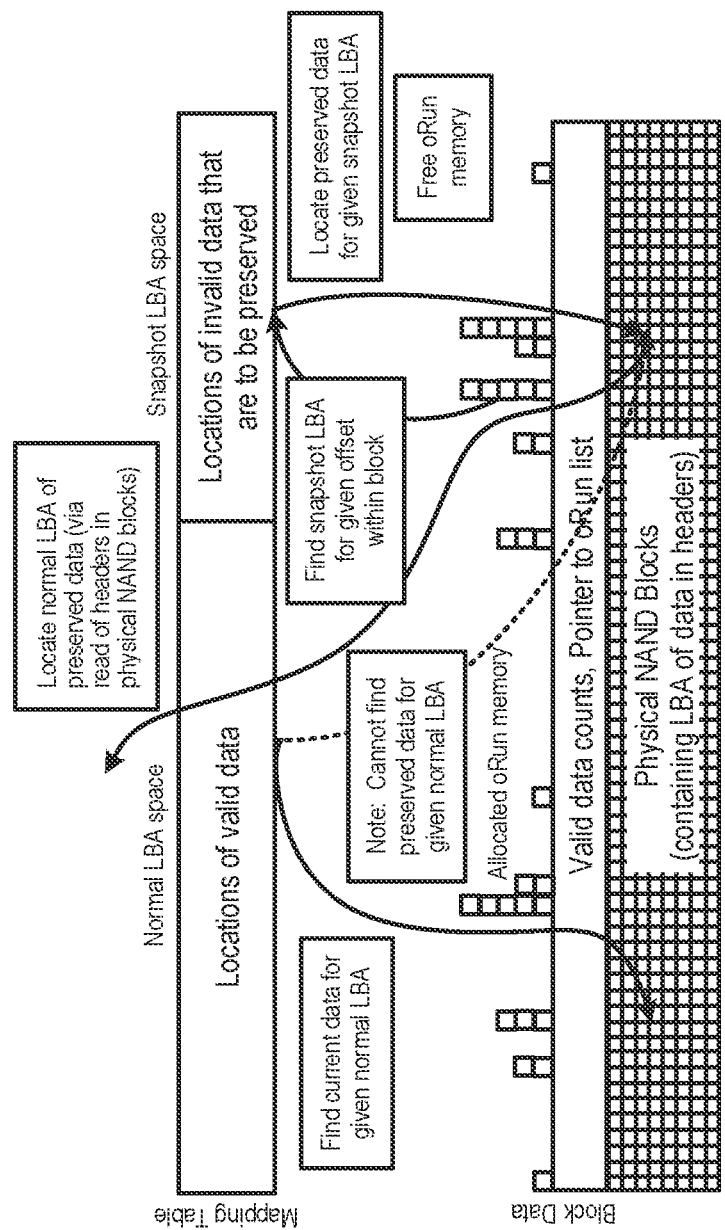
FIG. 5 is an illustration showing a relationship between block data and a mapping table of an embodiment.

Returning to the drawings, FIG. 5 is an illustration showing a relationship between block data and a mapping table of an embodiment. As shown in FIG. 5, the mapping table contains the logical block address space mentioned above, which has a host-accessible area ("normal LBA space") and a host-inaccessible area ("snapshot LBA space"). In this embodiment, the normal LBA space stores entries for valid data that associate the logical block address of valid data to the physical address of the block storing the data in the memory 104. This mapping can be used to find current data for a given normal LBA. The snapshot LBA space stores entries for valid data that associate the snapshot logical block address of valid data to the physical address of the block storing the data in the memory 104. This mapping can be used to find preserved data for a given normal snapshot LBA.

The block data is a representation of the physical NAND blocks in the memory 104. In this embodiment, the data stored in each memory block contains its associated LBA. The headers can be read to create the reverse LBA map associating physical addresses with logical addresses. This reverse mapping can be used to locate a normal LBA of preserved data. Also, as shown in FIG. 5, overrun (oRun) memory can be allocated, and pointers can be used to point to an oRun list. This can be used to find a snapshot LBA for a given offset within a block.

Figure 6:
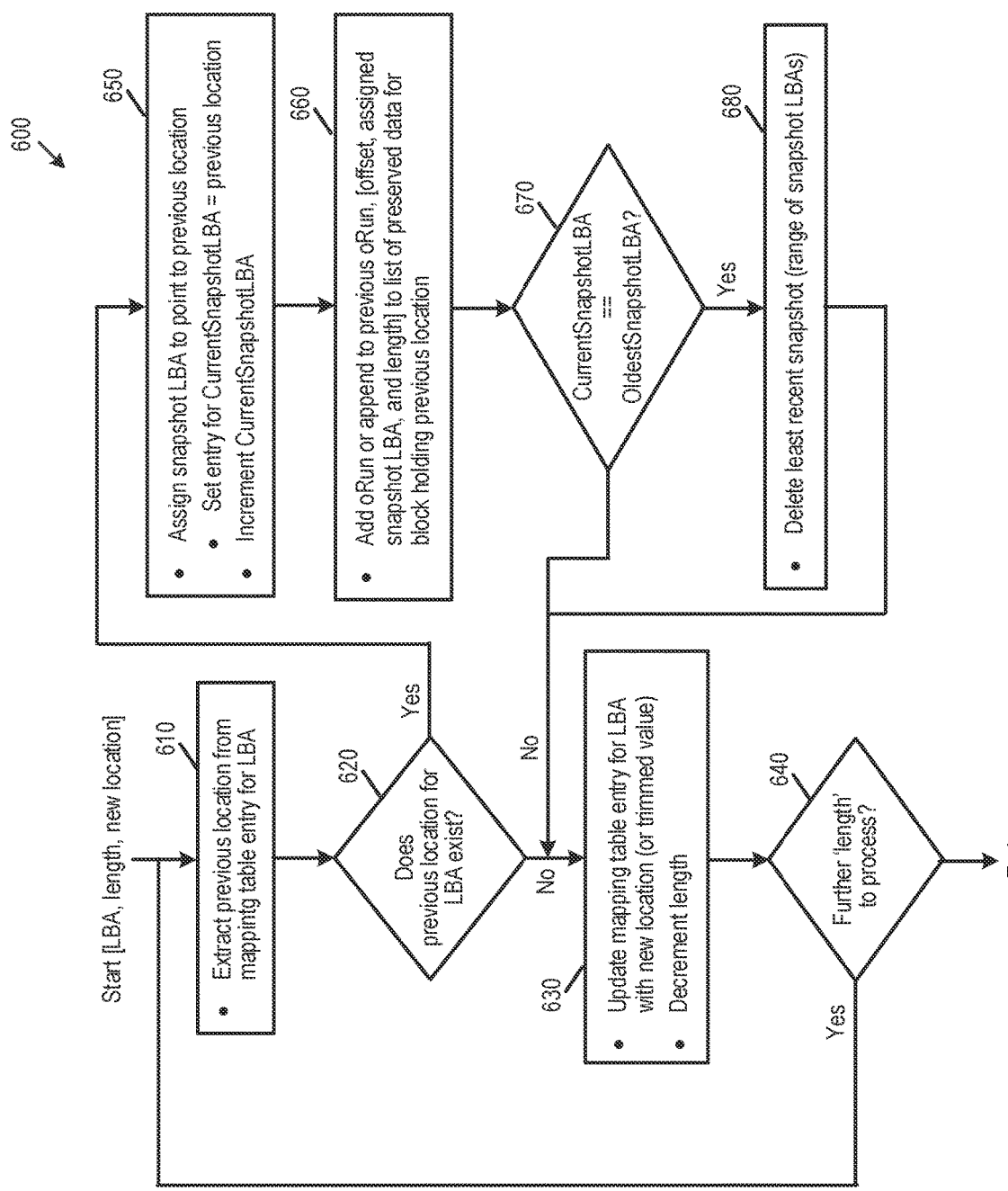
FIG. 6 is a flow chart of a write/trim process of an embodiment.

Turning now to FIG. 6, FIG. 6 is a flow chart 600 of a write/trim process of an embodiment. As shown in FIG. 6, in this embodiment, the process starts with the receipt of a write/trim command specifying a LBA, a length, and a new location. In response, the controller 102 of the storage system 100 extracts a previous location from the mapping table entry for the LBA (act 610) and determines if a previous location exists for the LBA (act 620). If a previous location does not exist, the controller 102 updates the mapping table entry for the LBA with the new location (or a trimmed value) and decrements the length (act 630). The controller 102 then returns to the start of the flowchart 600 in response to determining that there is further "length" to process (act 640).

However, if the controller 102 determines that a previous location exists for the LBA, the controller 102 assigns a snapshot LBA to point to the previous location by setting the entry for CurrentSnapshotLBA to equal the previous location and then increment the CurrentSnapshotLBA (act 650). The controller 102 then adds a new oRun (or, if physically and logically contiguous, appends length to a previous oRun) with an offset, assigned snapshot LBA, and length to the list of preserved data for the block holding the previous location (act 660). The controller 102 then determines if the CurrentSnapshotLBA equals the OldestSnapshotLBA (act 670). If it does, the controller 102 deletes the least-recent snapshot or range of snapshot LBAs (act 680). If it does not, act 630 is performed.

So, in the write/trim process in this embodiment, if data is overwritten in the host write process (or trimmed), the previous location of overwritten LBA is assigned to the current snapshot LBA, and the current snapshot LBA is incremented. The mSet (e.g., forward mapping table section) for the current snapshot LBA is filled-in to include the JBA of the overwritten data (prevJBA), and uRun may be avoided as mSets for snapshot LBAs are being filled sequentially, so open/filled snapshot mSets can be written each control sync. Also, in this embodiment, the valid data counter (VC) of the jBlock containing prevJBA is not updated. Further, an oRun is added to the oRun list of the jBlock of the prevJBA of form [offset, LBA, length]=8B, or appended to the last oRun. A new oItem is allocated as required. And if the current snapshot LBA reaches the end of the LBA space, it is reset to the start of the snapshot LBA space. If the current snapshot LBA reaches the start LBA of the oldest snapshot stored in the snapshot table, the oldest snapshot can be freed (e.g., during idle time when the current snapshot LBA gets "close" to it). If there is only one snapshot (the current one), the current snapshot can be reset, but that can be avoided by limiting the size (delta) of any snapshot.

Figure 7:
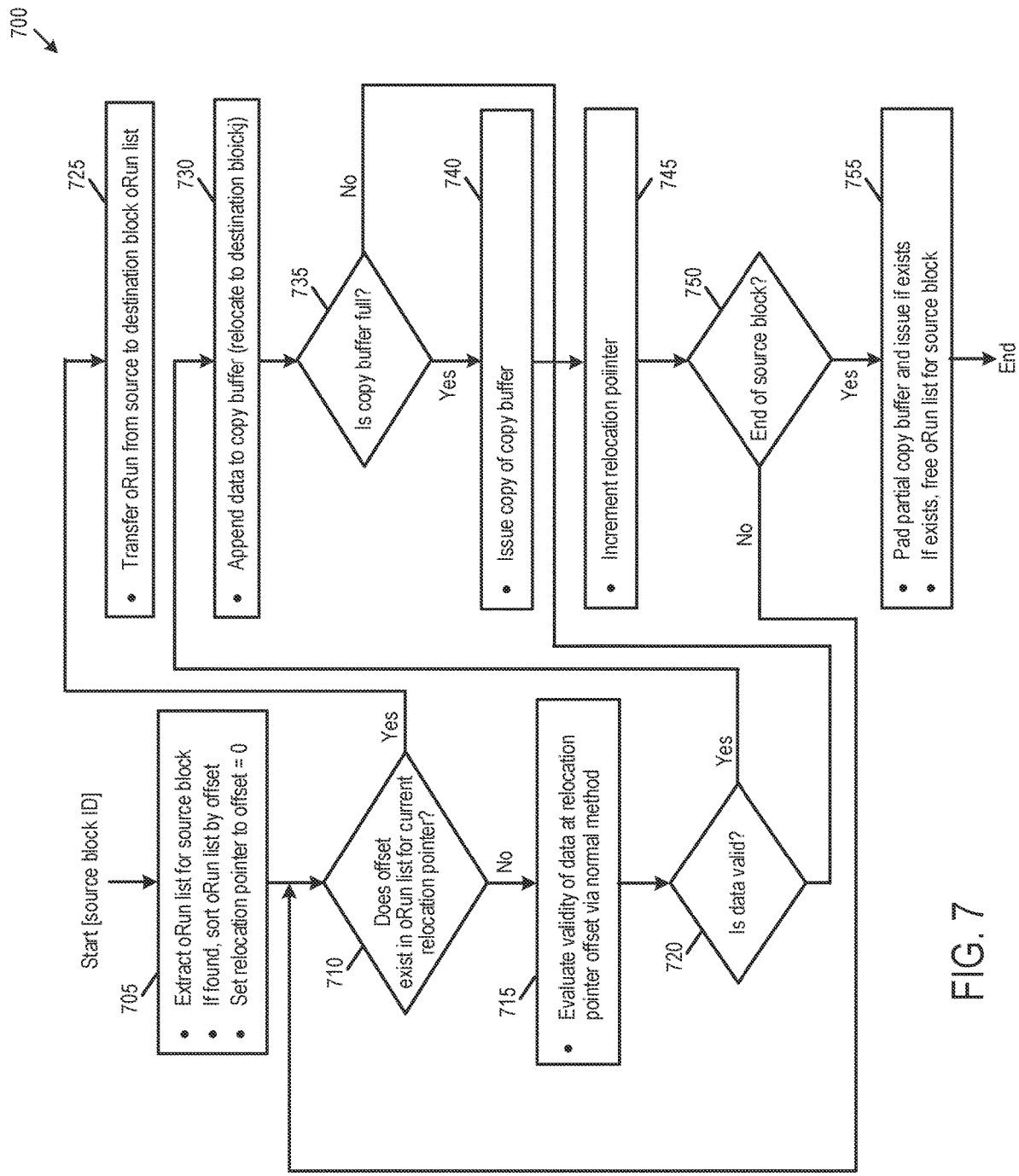
FIG. 7 is a flow chart of a relocation process of an embodiment.

FIG. 7 is a flow chart 700 of a relocation process of an embodiment. As shown in FIG. 7, in this embodiment, the process starts with the receipt of a source block ID. In response to receiving the source block ID, the controller 102 extracts the oRun list for the source block, sorts the oRun list by offset, and sets the relocation pointer to offset 0 (act 705). The controller 102 then determines if the offset exists in the oRun list for the current reallocation pointer (act 710). If the offset exists, the controller 102 transfers the oRun from the source to the destination block in the oRun list (act 725). If the offset does not exist, the controller 102 evaluates the validity of the data at the relocation pointer offset (act 715) and then determines if the data is valid (act 720).

If the data is valid, the controller 102 appends the data to a copy buffer to relocate the data to a destination block (act 730). The controller 102 then determines if the copy buffer is full (act 735). If the copy buffer is full, the controller 102 issues a copy of the copy buffer (act 740). Then (or if the copy buffer is not full or if the data is not valid), the controller 102 increments the relocation pointer (act 745) and then determines if it is at the end of the source block (act 750). If it is the end of the source block, the controller 102 pads the partial copy buffer and frees the oRun list for the source block (act 750); otherwise, the controller 102 returns to act 710.

Figure 8:
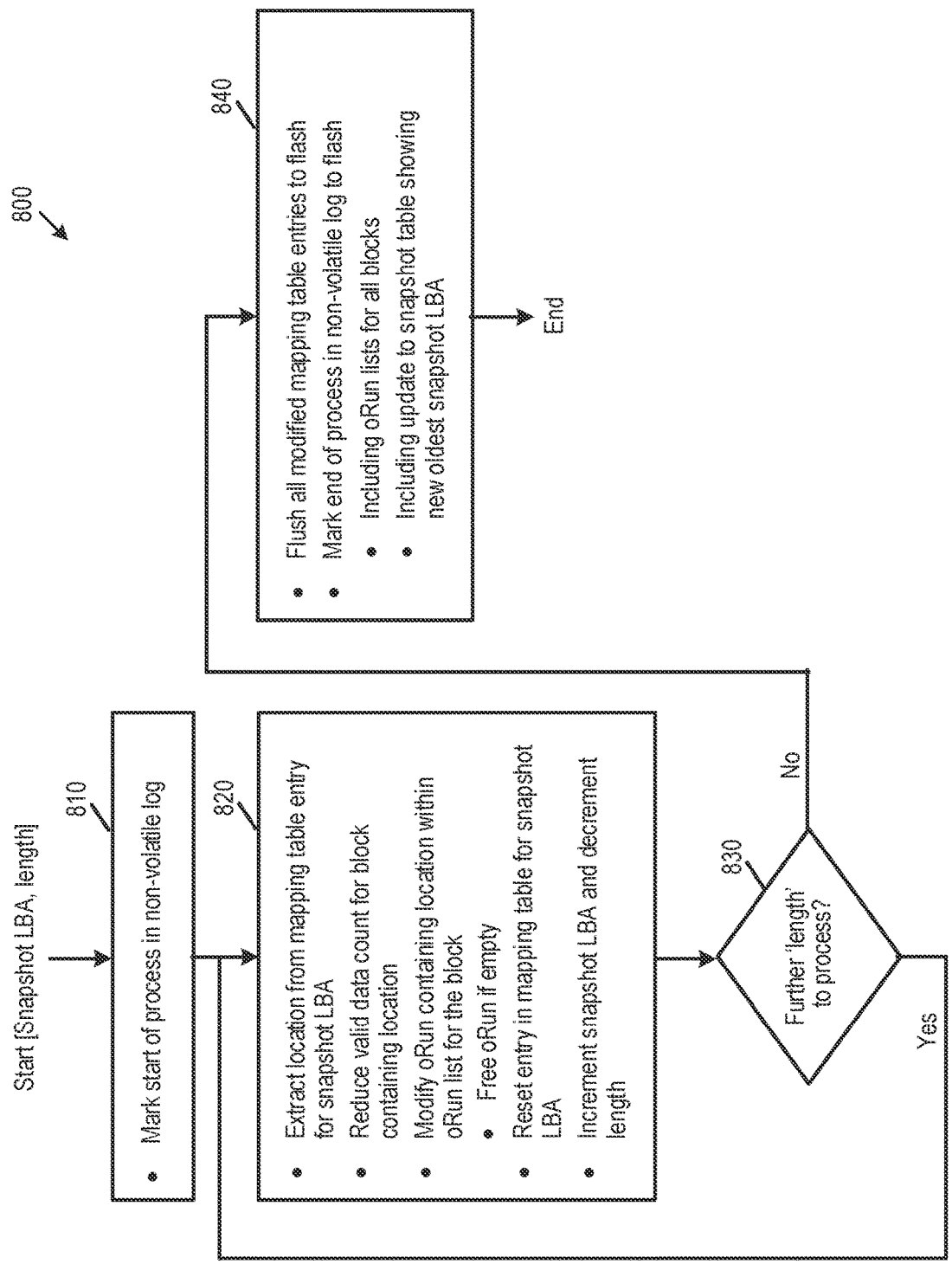
FIG. 8 is a flow chart of a snapshot delete process of an embodiment.

So, in the relocation process of this embodiment, data that has been overwritten and assigned to a snapshot is preserved. The source block VC being greater than zero can indicate that, within the block, data, including overwritten data, is present. The oRun list can be parsed for the source jBlock (if it exists), and the oRun list can be sorted using a sorting algorithm on an "offset" key at the start of relocation process. During the translation phase, any flash management unit (FMU) with an offset in the oRun list does not need to be translated, as it is set valid and will be copied (it contains still-relevant overwritten data that belongs to a snapshot). The oRun list for the target jBlock can be updated with the oRun (the offset will be different from the source block), and a new oItem can be allocated as required. The oRun list of the source block can be deleted when the block is fully relocated, and oItems can be returned to the pool FIG. 8 is a flow chart 800 of a snapshot delete process of an embodiment. As shown in FIG. 8, in this embodiment, the process starts with the receipt of a snapshot LBA and length. In response to receipt of the snapshot LBA and length, the controller 102 marks the start of the process in a non-volatile log (act 810). Then, the controller 102 extracts the location from the mapping table entry for the snapshot LBA, reduces the valid data count for the block containing the location, modifies the oRun containing location within the oRun list for the block (which would result in a free oRun, if empty), resets the entry in the mapping table for the snapshot LBA, increments the snapshot LBA, and decrements the length (act 820). The controller 102 then determines if there is a further length to process (act 810). If there is, the controller 102 flushes all modified mapping table entries to the memory 104 and marks the end of the process in the non-volatile log, which includes oRun lists for all blocks and updates to the snapshot table showing the new, oldest snapshot LBA (act 840). Otherwise, the controller 102 loops back to act 820.

So, in the snapshot delete process of this embodiment, only the oldest currently-preserved snapshot may be deleted (excluding rollback). The controller 102 can search mSets from the lowest LBA to the highest LBA of the snapshot to be deleted and process JBAs as per the overwrite process. In doing this, the controller 102 can reset the mSet entry for the LBA, decrement the VC of the jBlock to which the JBA was pointing, remove or modify the oRun for the offset within the jBlock, and free oItem if all oRuns are removed. In removing or modifying the oRun for an offset within the jBlock, the controller 102 can avoid splitting oRuns as an adjacent previous JBA will either have already been deleted as part of same oRun (if overwritten sequentially at same time as the current JBA) or not have been overwritten or have been overwritten subsequently but be part of a different oRun. Adjacent subsequent JBA may still be part of oRun in which case oRun is modified and not removed. The controller 102 can then write all modified mSets to the memory 104.

The controller 102 can also delete entries in the snapshot table and perform a control sync of the write snapshot table and oRun lists to log. The process can be preceded by a control sync in order to be ungraceful shutdown (UGSD) safe. That way, if an UGSD happens partway through snapshot delete, the snapshot delete process can simply be restarted.

Figure 9:
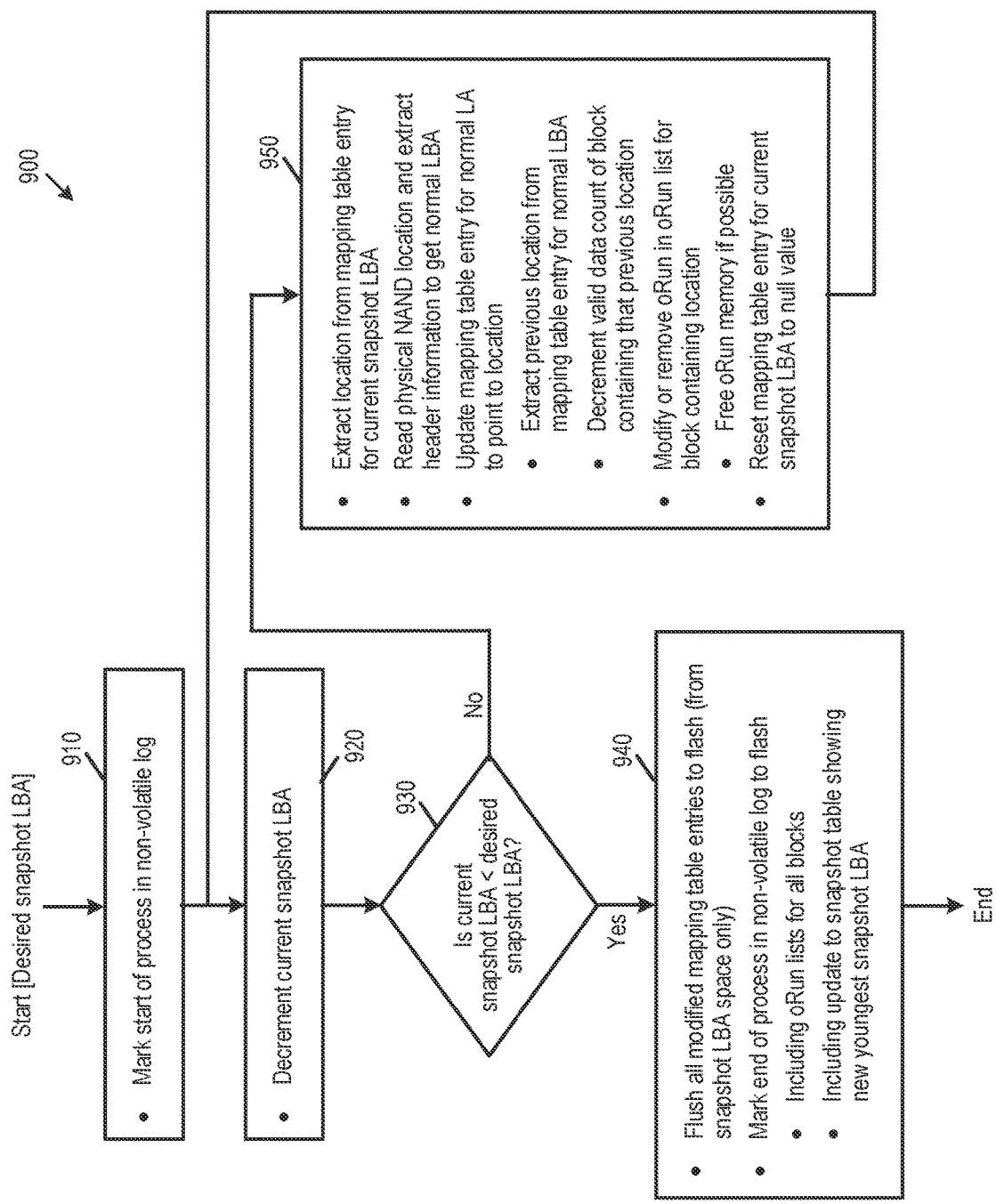
FIG. 9 is a flow chart of a snapshot rollback process of an embodiment.

FIG. 9 is a flow chart 900 of a snapshot rollback process of an embodiment. As shown in FIG. 9, in this embodiment, the process starts with the receipt of the desired snapshot LBA. In response to receipt of the desired snapshot LBA, the controller 102 marks the start of the process in a non-volatile log (act 910) and decrements the current snapshot LBA (act 920). Then, the controller 102 determines if the current snapshot LBA is less than the desired snapshot LBA (act 930). If it is, the controller 102 flushes all modified mapping table entries to the non-volatile memory 104 from the snapshot LBA space and marks the end of the process in the non-volatile log by including the oRun lists for all the blocks and updates to the snapshot table showing the new, youngest snapshot LBA (act 940). However, if the current snapshot LBA is not less than the desired snapshot LBA, the controller 102 extracts the location from the mapping table entry for the current snapshot LBA, reads the physical NAND location and extracts header information to get the normal LBA, updates the mapping table entry for the normal LBA to point to the location, modifies or removes the oRun in the oRun list for the block containing the location, and resets the mapping table entry for the current snapshot LBA to a null value (act 950).

So, in the snapshot rollback process of this embodiment, the controller 102 performs the following actions from the current snapshot in reverse to the desired snapshot. First, the controller 102 scans backwards through the mSet(s) corresponding to the current snapshot LBA. For each LBA, the controller 102 extracts the JBA and reads the metadata at the location to get the true LBA, "writes" the data back to the memory 104 as per a new host write by adding a uRun (containing true LBA, JBA pair) and updating the mSet of the true LBA, removes the oRun (or modify/split) for the JBA (e.g., by removing oItem if all oRuns are deleted and compacting oItems in each oRun list), extracts the prevJBA within the mSet for the true LBA (the location of the data for the LBA that was written after the snapshot which is longer to be preserved) and decrements VC in the prev jBlock location (the oRun list of the prev jBlock location may not contain an oRun at the prevJBA offset because the controller 102 is rolling back chronologically), maintains the validity count of the reinstated location, and resets the value of the snapshot LBA entry. The controller 102 continues running backwards in LBA space until the first LBA of the desired snapshot ID is reached and writes all modified mSets for the snapshot LBA space. The modified mSets for the user space or a list of changes to those mSets should be written to non-volatile memory 104. The controller 102 then deletes all entries in the table for the recent snapshots that have been rolled back. The current snapshot and current snapshot LBA should now be ready to start writing again from the rolled back state. In one embodiment, updates made since the rolled-back state are lost, and no snapshot forking is supported. The controller 102 can then perform a control sync between the write snapshot table and the oRun lists to log.

The process can be preceded by a control sync as well to be ungraceful-shutdown safe. That way, if an ungraceful shutdown happens partway through a snapshot rollback, the snapshot rollback process can simply be restarted.

As mention above, in one embodiment, oRuns and an oRun list are used. (For allocation efficiency, oRuns may be allocated in sets termed OItems.) Each jBlock can hold a pointer to its first oItem (may be null), and an oItem can hold linked list pointer(s) and oRuns. Each oRun can be Offset (2B), LBA (4B), Length (2B). Therefore, each jBlock can have a variable length oRun list. The memory pool of oItems can be of a configured size, and an unused oItem list can exist. If no free oItem exists and new an oItem is needed, an auto-trigger snapshot delete can be used to free up oItems.

The oItem pool size/capacity can be configured to any suitable amount. For example, the total snapshot capacity can be limited by the minimum of the snapshot LBA space and the oItem pool capacity. The oItem pool can be stored in a log and held entirely in RAM. For example, if the oItem pool is 256 KB, each oItem is 128 B, and each oItem contains 15 oRuns, then the minimum snapshot capacity is: 15*256 K/128=30720 FMUs=120 MB. In this example, the minimum capacity is far less than the proposed 100 GB of snapshot LBA space, but this is a minimum and applies only if overwrite is 4 KB RW. In most scenarios, overwrites can be much larger. To provide 100 GB of capacity in a 256 KB oItem pool, each overwrite, on average, can be 100 G/120 MB=850 FMUs=3.32 MB. The size can also be selected based on how a ransomware overwrite (encryption) occurs. If it just encrypts small parts of files of a filesystem, the oItem pool might fill quickly, forcing old snapshots to be flushed.

Any suitable trigger can be used as a snapshot rollback trigger. For example, an external application can be used to trigger a rollback and delete (e.g., via a user interface). Some form of communication from the storage system 100 to the application can be used (e.g., if the storage system 100 deletes snapshots if capacity runs out). In another embodiment, the storage system 100 triggers a rollback security check (e.g., if the rate of a forced snapshot delete is high, such as when there is a surge in small random overwrites, or if a signature is used).

In another embodiment, multiple overwrite bypasses are used. In this embodiment, each jBlock has a snapshot attribute (WrittenDuringCurrentSnapshotFlag, FirstOffsetOfCurrentSnapshot). Each time a block is opened, this attribute is set to [1,0]. Each time the current snapshot ID changes, all closed block attributes are reset to [0,0], and all open block attributes are set to [1, currentWritePointer]. During the write process, an additional check is made. Namely, if the snapshot attribute of the jBlock contained within the prevJBA (overwritten location) is set and the offset of the prevJBA is greater than or equal to the offset in the snapshot attribute, the controller 102 can skip the preservation of overwritten data (i.e., revert to legacy processing of host writes, decrement jBlock validity count, etc).

Finally, as mentioned above, any suitable type of memory can be used. Semiconductor memory devices include volatile memory devices, such as dynamic random access memory ("DRAM") or static random access memory ("SRAM") devices, non-volatile memory devices, such as ReRAM, electrically erasable programmable read only memory ("EEPROM"), flash memory (which can also be considered a subset of EEPROM), ferroelectric random access memory ("FRAM"), and MRAM, and other semiconductor elements capable of storing information. Each type of memory device may have different configurations.

For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two dimensional (2D) memory structure or a three dimensional (3D) memory structure.

In a 2D memory structure, the semiconductor memory elements are arranged in a single plane or a single memory device level. Typically, in a 2D memory structure, memory elements are arranged in a plane (e.g., in an x-z direction plane) that extends substantially parallel to a major surface of a substrate that supports the memory elements. The substrate may be a wafer over or in which the layer of the memory elements is formed or it may be a carrier substrate that is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A 3D memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a 3D memory structure may be vertically arranged as a stack of multiple 2D memory device levels. As another non-limiting example, a 3D memory array may be arranged as multiple vertical columns (e.g., columns extending substantially perpendicular to the major surface of the substrate, i.e., in the y direction) with each column having multiple memory elements in each column. The columns may be arranged in a 2D configuration, e.g., in an x-z plane, resulting in a 3D arrangement of memory elements with elements on multiple vertically stacked memory planes. Other configurations of memory elements in three dimensions can also constitute a 3D memory array.

By way of non-limiting example, in a 3D NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other 3D configurations can be envisioned wherein some NAND strings contain memory elements in a single memory level while other strings contain memory elements which span through multiple memory levels. 3D memory arrays may also be designed in a NOR configuration and in a ReRAM configuration.

Typically, in a monolithic 3D memory array, one or more memory device levels are formed above a single substrate. Optionally, the monolithic 3D memory array may also have one or more memory layers at least partially within the single substrate. As a non-limiting example, the substrate may include a semiconductor such as silicon. In a monolithic 3D array, the layers constituting each memory device level of the array are typically formed on the layers of the underlying memory device levels of the array. However, layers of adjacent memory device levels of a monolithic 3D memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic 3D memory arrays. Further, multiple 2D memory arrays or 3D memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the 2D and 3D structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, which are intended to define the scope of the claimed invention. Finally, it should be noted that any aspect of any of the embodiments described herein can be used alone or in combination with one another.

What is claimed is:

1. A storage system comprising:
a memory, wherein a logical block address space of the memory comprises a user space and a snapshot space; and
a controller coupled to the memory and configured to:
receive a command from a host to write data associated with a logical block address in the user space;
determine, from a logical-to-physical address map, whether the logical-to-physical address map contains an entry that associates a physical address with the logical block address;
in response to determining that the logical-to-physical address map does not contain the entry that associates the physical address with the logical block address, write the data in another physical address in the memory and store an entry in the logical-to-physical address map to associate the another physical address with the logical block address; and
in response to determining that the logical-to-physical address map contains the entry that associates the physical address with the logical block address:
assign previously-written data in the physical address to a snapshot logical block address in the snapshot space, and
modify the entry in the logical-to-physical address map to associate the physical address and the snapshot logical block address instead of the logical block address.

2. The storage system of claim 1, wherein the controller is further configured to use the modified entry in the map to recover previously-written data.

3. The storage system of claim 2, wherein the controller is further configured to delete the data in response to the previously-written data being recovered.

4. The storage system of claim 2, wherein recovering the previously-written data returns the storage system to a previous stable state.

5. The storage system of claim 2, wherein the previously-written data is recovered in response to a command from the host.

6. The storage system of claim 1, wherein the controller is further configured to dynamically change a size of the user space.

7. The storage system of claim 1, wherein the controller is further configured to dynamically change a size of the snapshot space.

8. The storage system of claim 1, wherein the controller is further configured to set a pointer to a current snapshot logical block address in the snapshot space and increment the pointer in response to a new snapshot logical block address being assigned.

9. The storage system of claim 1, wherein the controller is further configured to remove the association of the physical address and the snapshot logical block address.

10. The storage system of claim 9, wherein the association is removed in response to available space in the snapshot space falling below a threshold.

11. The storage system of claim 1, wherein the controller is further configured to modify the entry in the logical-to-physical address map after a garbage collection operation moves the previously-written data.

12. The storage system of claim 1, wherein the user space is accessible by the host, and wherein the snapshot space is inaccessible by the host.

13. The storage system of claim 1, wherein the memory comprises a three-dimensional memory.

14. In a storage system comprising a memory, wherein a logical block address space of the memory comprises a user space and a snapshot space, a method comprising:
receiving a command from a host to write data associated with a logical block address in the user space;
determining, from a logical-to-physical address map, whether the logical-to-physical address map contains an entry that associates a physical address with the logical block address;
writing the data in another physical address in the memory and storing an entry in the logical-to-physical address map to associate the another physical address with the logical block address in response to determining that the logical-to-physical address map does not contain the entry that associates the physical address with the logical block address; and
performing the following in response to determining that the logical-to-physical address map contains the entry that associates the physical address with the logical block address:
assigning previously-written data in the physical address to a snapshot logical block address in the snapshot space; and
modifying the entry in the logical-to-physical address map to associate the physical address and the snapshot logical block address instead of the logical block address.

15. The method of claim 14, further comprising performing a rollback operation.

16. The method of claim 14, further comprising preserving the previously-written data during a garbage collection operation.

17. The method of claim 16, further comprising updating the entry in the logical-to-physical address map in response to the garbage collection operation.

18. The method of claim 14, wherein the user space is accessible by the host, and wherein the snapshot space is inaccessible by the host.

19. The method of claim 14, further comprising removing the association in response to available space in the memory falling below a threshold.

20. A storage system comprising:
a memory, wherein a logical block address space of the memory comprises a user space and a snapshot space;
means for receiving a command from a host to write data associated with a logical block address in the user space;
means for determining, from a logical-to-physical address map, whether the logical-to-physical address map contains an entry that associates a physical address with the logical block address;
means for writing the data in another physical address in the memory and storing an entry in the logical-to-physical address map to associate the another physical address with the logical block address in response to determining that the logical-to-physical address map does not contain the entry that associates the physical address with the logical block address; and
means for performing the following in response to determining that the logical-to-physical address map contains the entry that associates the physical address with the logical block address:
assigning previously-written data in the physical address to a snapshot logical block address in the snapshot space; and modifying the entry in the logical-to-physical address map to associate the physical address and the snapshot logical block address instead of the logical block address.

* * * * *